United States Patent [19]

Hasegawa et al.

[11] Patent Number: 4,596,164

[45] Date of Patent: Jun. 24, 1986

[54] AIR-FUEL RATIO CONTROL METHOD FOR INTERNAL COMBUSTION ENGINES FOR VEHICLES

[75] Inventors: Shumpei Hasegawa, Niiza; Osamu Gotoh, Higashikurume; Yutaka Otobe, Shiki, all of Japan

[73] Assignee: Honda Giken Kogyo K.K., Tokyo, Japan

[21] Appl. No.: 523,715

[22] Filed: Aug. 16, 1983

[30] Foreign Application Priority Data

Aug. 19, 1982 [JP] Japan ............................... 57-143946

[51] Int. Cl.⁴ ..................... B60K 41/08; F02M 51/00; F02M 37/04; G06G 7/70

[52] U.S. Cl. ........................................ 74/860; 74/859; 123/478; 123/480; 123/494; 364/431.05

[58] Field of Search .................. 74/859, 860; 123/478, 123/480, 494; 364/431.05

[56] References Cited

U.S. PATENT DOCUMENTS

| | | | |
|---|---|---|---|
| Re. 29,741 | 8/1978 | Norimatsu et al. | 364/431.05 X |
| 3,483,851 | 12/1969 | Reichardt | 123/483 |
| 4,120,214 | 10/1978 | Toda et al. | 74/859 X |
| 4,148,230 | 4/1979 | Kodama et al. | 74/859 |
| 4,165,722 | 8/1979 | Aoyama | 74/860 X |
| 4,170,201 | 10/1979 | Camp et al. | 123/492 X |
| 4,245,604 | 1/1981 | Lahiff | 74/860 X |
| 4,257,381 | 3/1981 | Yuzawa et al. | 74/860 X |
| 4,275,694 | 6/1981 | Nagaishi | 123/478 X |
| 4,276,601 | 6/1981 | Tokuda et al. | 364/431.05 X |
| 4,445,483 | 5/1984 | Hasegawa | 123/492 |
| 4,459,669 | 7/1984 | Chujo et al. | 364/431.05 X |
| 4,465,051 | 8/1984 | Hasegawa | 123/478 X |
| 4,466,411 | 8/1984 | Hasegawa et al. | 123/478 X |
| 4,484,555 | 11/1984 | Miura | 74/860 X |

*Primary Examiner*—Allan D. Herrmann
*Assistant Examiner*—Stephen B. Andrews
*Attorney, Agent, or Firm*—Arthur L. Lessler

[57] ABSTRACT

In an air-fuel ratio control method for electronically controlling the air-fuel ratio of a mixture being supplied to an internal combustion engine for a vehicle in response to operating conditions of the engine, a predetermined value of a parameter indicative of loads on the engine is set which corresponds at least to a detected value of a parameter indicative of the gear position of the transmission of the vehicle, and when a detected value of the engine load parameter is smaller than the set predetermined value, leaning of the mixture is effected. As the detected value of the above gear position parameter indicates a lower speed gear position, the above predetermined value of the above engine load parameter is set to a smaller value. Preferably, the predetermined value of the engine load parameter is set to a value also correponding to a detected value of engine temperature and/or a detected value of engine speed, in addition to a detected value of the gear position parameter.

10 Claims, 5 Drawing Figures

AIR-FUEL RATIO CONTROL METHOD FOR INTERNAL COMBUSTION ENGINES FOR VEHICLES

BACKGROUND OF THE INVENTION

This invention relates to a control method for electronically controlling the air-fuel ratio of an air-fuel mixture being supplied to an internal combustion engine for vehicles, and more particularly to an air-fuel ratio control method which controls the air-fuel ratio of the mixture in response to loads on the engine as well as the gear position of the transmission, thereby to optimize the driveability, emission characteristics and fuel consumption of the engine.

A fuel supply control system adapted for use with an internal combustion engine, particularly a gasoline engine has been proposed e.g. by U.S. Pat. No. 3,483,851, which is adapted to determine the valve opening period of a fuel injection device for control of the fuel injection quantity, i.e. the air/fuel ratio of an air/fuel mixture being supplied to the engine, by first determining a basic value of the above valve opening period as a function of engine rpm and intake pipe absolute pressure and then adding to and/or multiplying same by constants and/or coefficients being functions of engine rpm, intake pipe absolute pressure, engine temperature, throttle valve opening, exhaust gas ingredient concentration (oxygen concentration), etc., by electronic computing means.

On the other hand, it has conventionally been employed to lean an air-fuel mixture being supplied to an internal combustion engine for the purpose of improving the fuel consumption. Further, in order to avoid inconveniences caused by such leaning of the air-fuel mixture, such as deterioration of the emission characteristics and driveability of the engine which are derived from a drop in the conversion efficiency of a three-way catalyst for purifying the exhaust gases and a drop in the engine output, it has been proposed by Japanese Provisional Patent Publication (Kokai) No. 54-1724 to control the air-fuel ratio of the mixture in response to the speed of the vehicle or the rotational speed of the engine. However, it will be difficult to ensure required driveability of the engine merely by controlling the air-fuel ratio of the mixture in response to the vehicle speed or the engine rotational speed alone under various operating conditions of the engine as in the proposed method. Particularly, while the engine is accelerating, leaning of the mixture will result in deterioration of the driveability due to shortage in the engine output. Therefore, it is essentially required to discriminate whether or not the engine is operating in a mixture-leaning condition or in an accelerating condition.

To comply with such requirement, it has been proposed by the assignee of the present application to use engine rotational speed and intake pipe absolute pressure as paramaters for discriminating the mixture-leaning condition of the engine, and effect leaning of the mixture when the engine is operating in a predetermined low load condition where the engine rotational speed is higher than a predetermined value and the intake pipe absolute pressure is lower than a predetermined value (U.S. Pat. No. 4,445,483).

On the other hand, whether or not the engine is in an accelerating condition can be determined from the gear position of a transmission installed in the vehicle. That is, in most cases where the transmission is in a low speed gear position and the intake pipe absolute pressure in the engine is high, the driver of the vehicle wants acceleration of the vehicle, while in most cases where the transmission is in a high speed gear position, the driver wants cruising. Therefore, it will be possible to control the air-fuel ratio in a manner more appropriate to the operating conditions of the engine, if mixture-leaning regions of the engine are set in dependence on the gear position of the transmission.

SUMMARY OF THE INVENTION

It is the object of the invention to provide an air-fuel ratio control method for internal combustion engines for vehicles, which is adapted to determine whether or not the engine is in a mixture-leaning region, on the basis of the engine load as well as the gear position of the transmission, thereby improving not only the driveability of the engine at acceleration, but also the emission characteristics and fuel consumption of the engine.

According to the invention, there is provided an air-fuel ratio control method for electronically controlling the air-fuel ratio of an air-fuel mixture being supplied to an internal combustion engine for a vehicle equipped with a transmission having a plurality of different speed gear positions, in response to operating conditions of the engine. The method according to the invention is characterized by comprising the following steps:

(1) detecting the value of a first parameter indicative of loads on the engine; (2) detecting the value of a second parameter indicative of which of the gear positions the transmission assumes; (3) setting a predetermined value of the first parameter which corresponds to the detected value of the second parameter; and (4) leaning the mixture being supplied to the engine while the detected value of the first parameter is smaller than the above set predetermined value.

The above step (3) comprises setting the above predetermined value of the first parameter to a smaller value as the detected value of the second parameter indicates a lower speed one of the gear positions of the transmission.

Preferably, the first parameter comprises absolute pressure in the intake pipe of the engine at a location downstream of a throttle valve in the intake pipe.

Further preferably, the above predetermined value of the first parameter is set to a value corresponding to a detected value of engine temperature and/or a detected value of engine rotational speed, in addition to a detected value of the second parameter.

The above and other objects, features and advantages of the invention will be more apparent from the ensuing detailed description taken in conjunction with the accompanying drawings.

DETAILED DESCRIPTION

The method according to the invention will now be described in detail with reference to the drawings.

Figure 1:
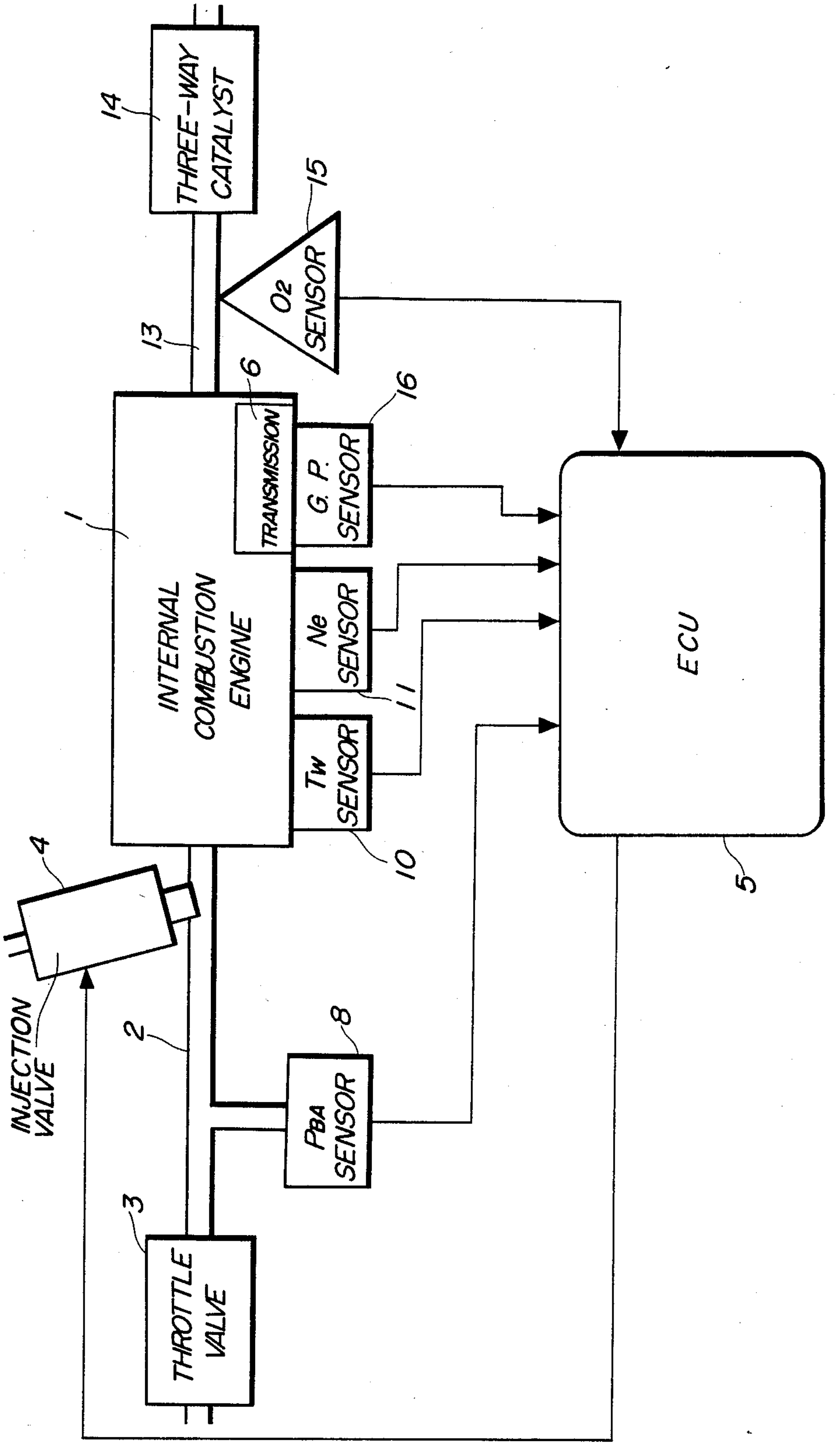
FIG. 1 is a block diagram of the whole arrangement of an air-fuel ratio control system for an internal combustion engine, to which is applicable the method of the invention.

Referring first to FIG. 1, there is illustrated the whole arrangement of an air-fuel ratio control system for an internal combustion engine, to which the method of the present invention is applicable. Reference numeral 1 designates a multi-cylinder type internal combustion engine which may have four cylinders, for instance. An intake pipe 2 is connected to the engine 1, in which is arranged a throttle valve 3. Fuel injection valves 4, only one of which is shown, are each arranged in the intake pipe 2 at a location between the engine 1 and the throttle valve 3 and slightly upstream of an intake valve, not shown, of a corresponding engine cylinder, and connected to a fuel pump, not shown. Further, the fuel injection valves 4 are electrically connected to an electronic fuel control unit (hereinafter called "the ECU") 5 in a manner having their valve opening periods or fuel injection quantities controlled by signals supplied from the ECU 5.

On the other hand, an absolute pressure (PBA) sensor 8 communicates with the interior of the intake pipe 2 at a location immediately downstream of the throttle valve 3. The absolute pressure sensor 8 is adapted to detect absolute pressure in the intake pipe 2 and applies an electrical signal indicative of detected absolute pressure to the ECU 5.

An engine coolant temperature sensor 10, which may be formed of a thermistor or the like, is mounted on the main body of the engine 1 in a manner embedded in the peripheral wall of an engine cylinder having its interior filled with cooling water, an electrical output signal of which is supplied to the ECU 5.

An engine speed sensor (hereinafter called "the Ne sensor") 11 is arranged in facing relation to a camshaft, not shown, of the engine 1 or a crankshaft of same, not shown. The Ne sensor 11 is adapted to generate one pulse at a particular crank angle of the engine each time the engine crankshaft rotates through 180 degrees, i.e., upon generation of each pulse of a top-dead-center position (TDC) signal. The pulses generated by the sensor 11 are supplied to the ECU 5.

A three-way catalyst 14 is arranged in an exhaust pipe 13 extending from the main body of the engine 1 for purifying ingredients HC, CO and NOx contained in the exhaust gases. An $O_2$ sensor 15 is inserted in the exhaust pipe 13 at a location upstream of the three-way catalyst 14 for detecting the concentration of oxygen in the exhaust gases and supplying an electrical signal indicative of a detected concentration value to the ECU 5.

Further connected to the engine 1 is a gear position switch 16 which is disposed to detect which of a plurality of different speed gear positions is assumed by a transmission 6 of the engine 1, which may be a five-speed manual type, for instance. The gear position switch 16 is adapted to electrically detect the gear position of the transmission 6. According to an embodiment of the invention, the gear position switch 16 is adapted to electrically sense the position of a speed change lever, not shown, of the transmission to determine whether the transmission 16 is in an accelerating gear position (e.g. the first speed position to the third speed position) or in a cruising gear position (e.g. the fourth speed position or the fifth speed position). The gear position switch 16 is also electrically connected to the ECU 5 for supplying an electrical signal indicative of the sensed gear position of the transmission 16 thereto.

The ECU 5 operates on the above-mentioned various engine operation parameter signals to determine operating conditions of the engine such as mixture-leaning regions, and arithmetically calculate the fuel injection period TOUT for the fuel injection valves, by the use of the following equation in accordance with operating conditions of the engine:

$$TOUT = Ti \times (K_1 \times KTW \times KO_2 \times KLS) + K_2 \quad (1)$$

where Ti represents a basic value of the valve opening period for the fuel injection valves 4, which is determined as a function of engine rpm Ne and intake pipe absolute pressure PBA, $K_1$ a correction coefficient or a product of two or more such coefficients applicable according to necessity, such as at wide-open-throttle, KTW a fuel quantity-increasing coefficient dependent upon engine temperature TW, $KO_2$ an $O_2$ sensor output-dependent feedback control correction coefficient, and KLS a mixture-leaning coefficient applicable when the engine is operating in any of mixture-leaning regions, hereinafter referred to. Further, $K_2$ represents a correction variable or a product of two or more such variables applicable according to necessity, such as a battery voltage-dependent correction variable.

The ECU 5 operates on the fuel injection period TOUT determined as above to supply driving signals to the fuel injection valves 4 to open same.

Figure 2:
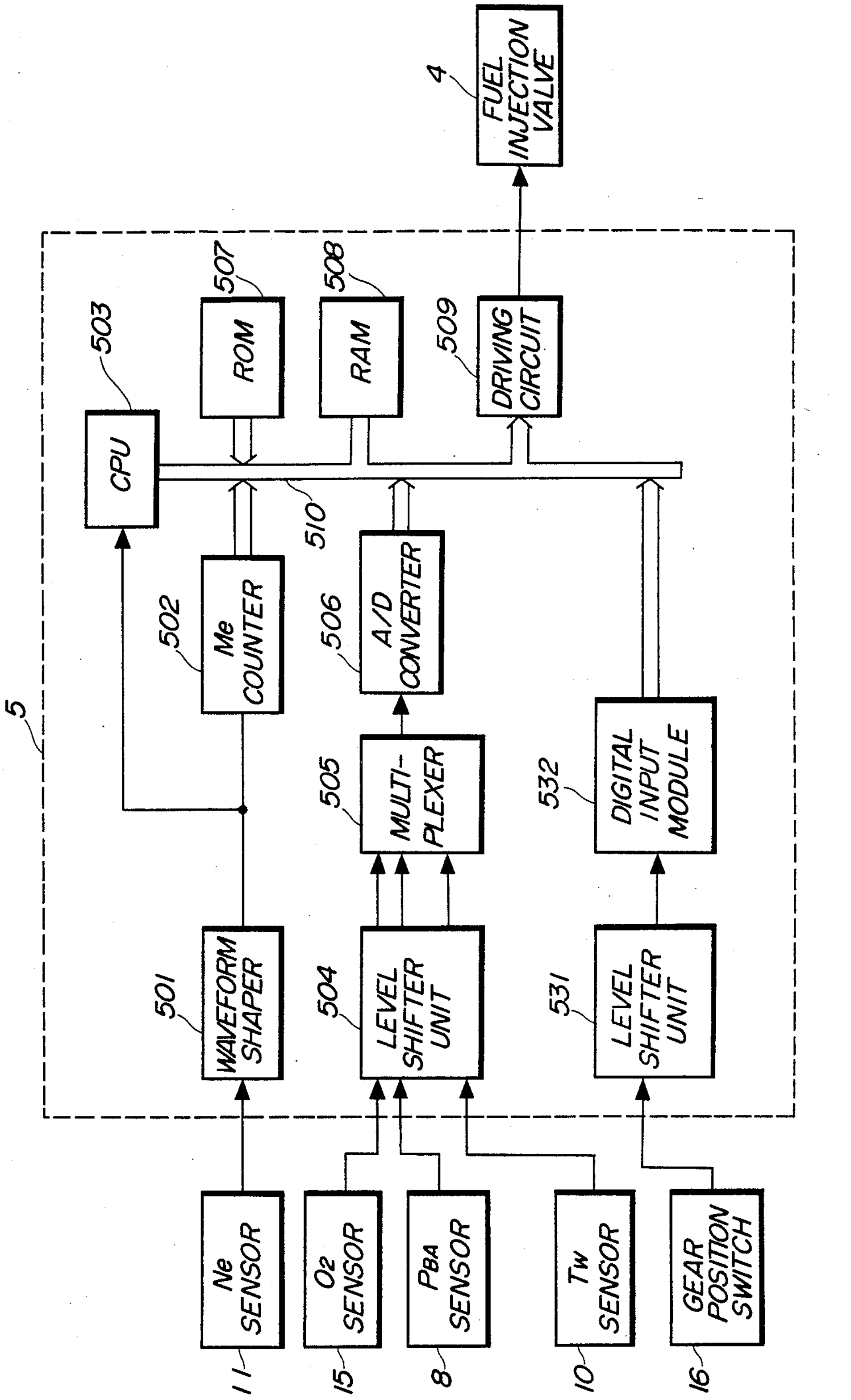
FIG. 2 is a block diagram of the internal arrangement of an electronic control unit (ECU) appearing in FIG. 1.

FIG. 2 shows a circuit configuration within the ECU 5 in FIG. 1. An output signal from the Ne sensor 11 in FIG. 1 is applied to a waveform shaper 501, wherein it has its pulse waveform shaped, and supplied to a central processing unit (hereinafter called "the CPU") 503, as the TDC signal, as well as to an Me value counter 502. The Me value counter 502 counts the interval of time between a preceding pulse of the TDC signal generated at a predetermined crank angle of the engine and a present pulse of the same signal generated at the same crank angle, inputted thereto from the Ne sensor 11, and therefore its counted value Me corresponds to the reciprocal of the actual engine rpm Ne. The Me value counter 502 supplies the counted value Me to the CPU 503 via a data bus 510.

The respective output signals from the absolute pressure (PBA) sensor 8, the engine coolant temperature sensor 10, the $O_2$ sensor 15, etc. have their voltage levels successively shifted to a predetermined voltage level by a level shifter unit 504 and applied to an analog-to-digital converter 506 through a multiplexer 505. The analog-to-digital converter 506 successively converts into digital signals analog output voltages from the aforementioned various sensors, and the resulting digital signals are supplied to the CPU 503 via the data bus 510. An output signal from the gear position switch 16 has its voltage level shifted to a predetermined level by another level shifter 531 and changed into a corresponding digital signal by a digital input module 532, and supplied to the CPU 503 via the data bus 510.

Further connected to the CPU 503 via the data bus 510 are a read-only memory (hereinafter called "the ROM") 507, a random access memory (hereinafter called "the RAM") 508 and a driving circuit 509. The RAM 508 temporarily stores various calculated values from the CPU 503, while the ROM 507 stores a control program executed within the CPU 503 as well as maps of values of the basic fuel injection period Ti for the fuel injection valves 4, maps and tables of various correction coefficients and correction variables, etc. The CPU 503 executes the control program stored in the ROM 507 in synchronism with generation of pulses of the TDC signal to calculate the fuel injection period TOUT for the fuel injection valves 4 in response to values of the various engine operation parameter signals, and supplies the calculated value of fuel injection period to the driving circuit 509 through the data bus 510. The driving circuit 509 supplies driving signals corresponding to the above calculated TOUT value to the fuel injection valves 4 to drive same.

Figure 3:
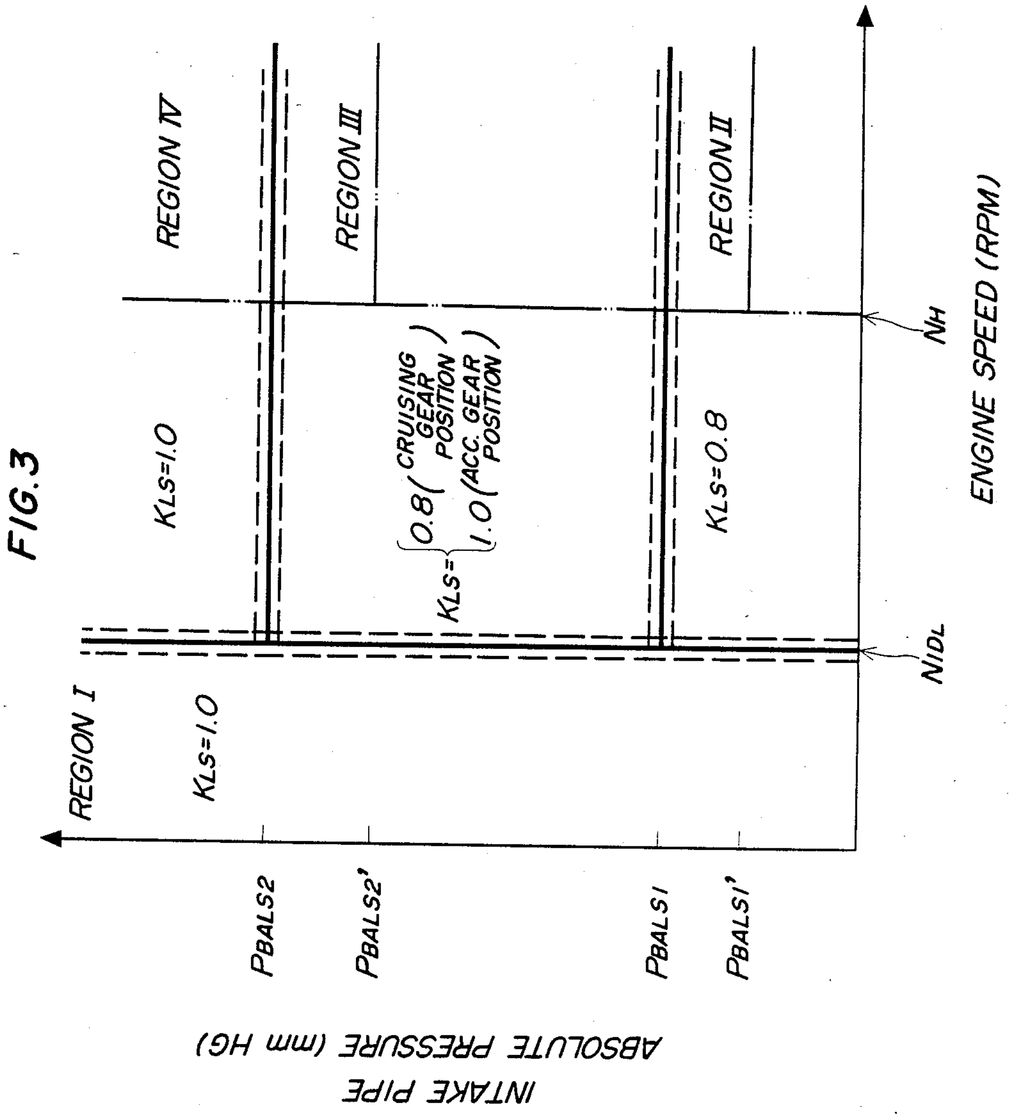
FIG. 3 is a graph showing a plurality of operating regions of the engine which are defined by engine rpm and intake pipe absolute pressure, according to one embodiment of the invention.

FIG. 3 is a graph showing an embodiment of the method according to the invention. In this embodiment, intake pipe absolute pressure PBA is used as a parameter indicative of loads on the engine, and the operating regions of the engine are divided into a plurality of operating regions I–IV including two mixture-leaning regions II and III which are defined by the intake pipe absolute pressure PBA. The two mixture-leaning regions II, III are defined, respectively, as a region where the intake pipe absolute pressure PBA is lower than a first predetermined value PBALS1 and the engine rotational speed Ne is higher than a predetermined value NIDL, hereinafter referred to, and a region where the absolute pressure PBA is higher than the first predetermined value PBALS1 but lower than a second predetermined value PBALS2. Further, when an output signal from the gear position switch 16 in FIG. 1 indicates an accelerating gear position, leaning of the mixture is effected only in the region II where the absolute pressure PBA is lower than the first predetermined value PBALS1, and when the output signal indicates a cruising gear position, leaning of the mixture is effected in the region III where the absolute pressure PBA is lower than the second predetermined value PBALS2, as well as in the region II. While the engine is operating in these mixture-leaning regions II, III, the air-fuel ratio of the mixture is controlled in open loop mode in a manner such that the basic value Ti of the fuel injection period TOUT is corrected by the aforementioned mixture-leaning correction coefficient KLS according to the aforementioned equation (1). On the other hand, in the other operating regions where leaning of the mixture is prohibited, the air-fuel ratio is controlled in open loop mode in a manner such that the Ti value is corrected by other respective correction coefficients while the value of the mixture-leaning coefficient KLS is held at 1.0 so as to obtain respective proper air-fuel ratios appropriate to operating conditions of the engine, or in feedback control mode in a manner such that the Ti value is corrected by the value of the correction coefficient $KO_2$ which has a value variable in response to changes in the output from the $O_2$ sensor 15 so as to control the air-fuel ratio to a theoretical, i.e. stoichiometric value.

In the graph of FIG. 3, in the region I where the engine rpm Ne is smaller than the predetermined value NIDL (e.g. 1000 rpm) which is slightly higher than the idling speed at which the engine is operating with the throttle valve in its idling position, leaning of the mixture is prohibited irrespective of the gear position of the transmission 6, by setting the value of the mixture-leaning coefficient KLS to 1.0. This is because if the mixture is leaned immediately when the engine is accelerated from an idling state to start the vehicle from its standing position, there will occur a shortage in the shaft torque of the engine, resulting in deterioration of the driveability.

If the output signal from the gear position switch 16 indicates an accelerating gear position of the transmission 6 (any of the first through third speed gear positions), the first predetermined value PBALS1 is selected as the predetermined value of the intake pipe absolute pressure PBA for determining whether to effect leaning of the mixture. This first predetermined value is set at a value of 250 mmHg, for instance, which is smaller than a value of intake pipe absolute pressure normally assumed when the engine is accelerated with the transmission in an accelerating gear position or in a cruising gear position at an engine speed exceeding the predetermined value NIDL. When the output signal from the absolute pressure sensor 18 indicates a value of intake pipe absolute pressure PBA lower than the first predetermined value PBALS1, that is, it is determined that the engine is operating in the region II, the value of the mixture-leaning coefficient KLS is set to a predetermined value XLS, e.g. 0.8 to lean the mixture. Since normally the engine cannot be operating in this region II when it is accelerating, leaning of the mixture can be effected there irrespective of the gear position of the transmission, without spoiling the driveability of the engine.

Next, when the output signal from the gear position switch 16 indicates a cruising gear position (e.g. the fourth speed gear position or the fifth speed gear position), the second predetermined value PBALS2 is selected as the predetermined value of the absolute pressure PBA for determining whether to effect leaning of the mixture. This second predetermined value PBALS2 is set at a value of 600 mmHg, for instance, which is smaller than a value of intake pipe absolute pressure PBA normally assumed when the engine is accelerated with the transmission in a cruising gear position at an engine speed exceeding the predetermined value NIDL. When the output signal from the absolute pressure sensor 8 indicates a value of intake pipe absolute pressure PBA lower than the second predetermined value PBALS2 or the engine is operating in the region III, the value of the mixture-leaning coefficient KLS is set to the predetermined value XLS or 0.8 to lean the mixture. This is because when the engine is operating in this region III with the transmission in a cruising gear position, it is usually in a normal operative state such as high speed cruising, and on such occasion, leaning of the mixture will not spoil the driveability of the engine.

When it is determined from the output signals from the gear position switch 16 and the absolute pressure sensor 8 that the engine is operating in the region III where the intake pipe absolute pressure PBA exceeds the first predetermined value PBALS1, with the transmission in an accelerating gear position, or when the engine is operating in the region IV where the intake pipe absolute pressure PBA exceeds the second predetermined value PBALS2, with the transmission in a cruising gear position, leaning of the mixture is prohibited by setting the mixture-leaning coefficient KLS to 1.0. This is because if either of such determinations holds, the engine is usually accelerating if it is operating in the region III and is operating under a heavily loaded condition if it is operating in the region IV such as running an upward slope, and therefore on both occasions leaning of the mixture would cause spoilage of the driveability of the engine.

As seen in the graph of FIG. 3, according to the invention, the predetermined engine rpm value NIDL, and the predetermined intake pipe absolute pressure values PBALS1, PBALS2 are each provided with a hysteresis margin, that is, set at different values between entrance into the mixture-leaning regions and departure therefrom. More specifically, the predetermined engine rpm value NIDL has a hysteresis margin of ±50 rpm, and each of the predetermined intake pipe absolute pressure values PBALS1, PBALS2 has a hysteresis margin of ±5 mmHg. The provision of such hysteresis margins assures stable operation of the engine by substantially absorbing fine fluctuations in the engine rpm and the intake pipe absolute pressure PBA in the vicinities of their predetermined values defining the mixture-leaning regions.

Figure 4:
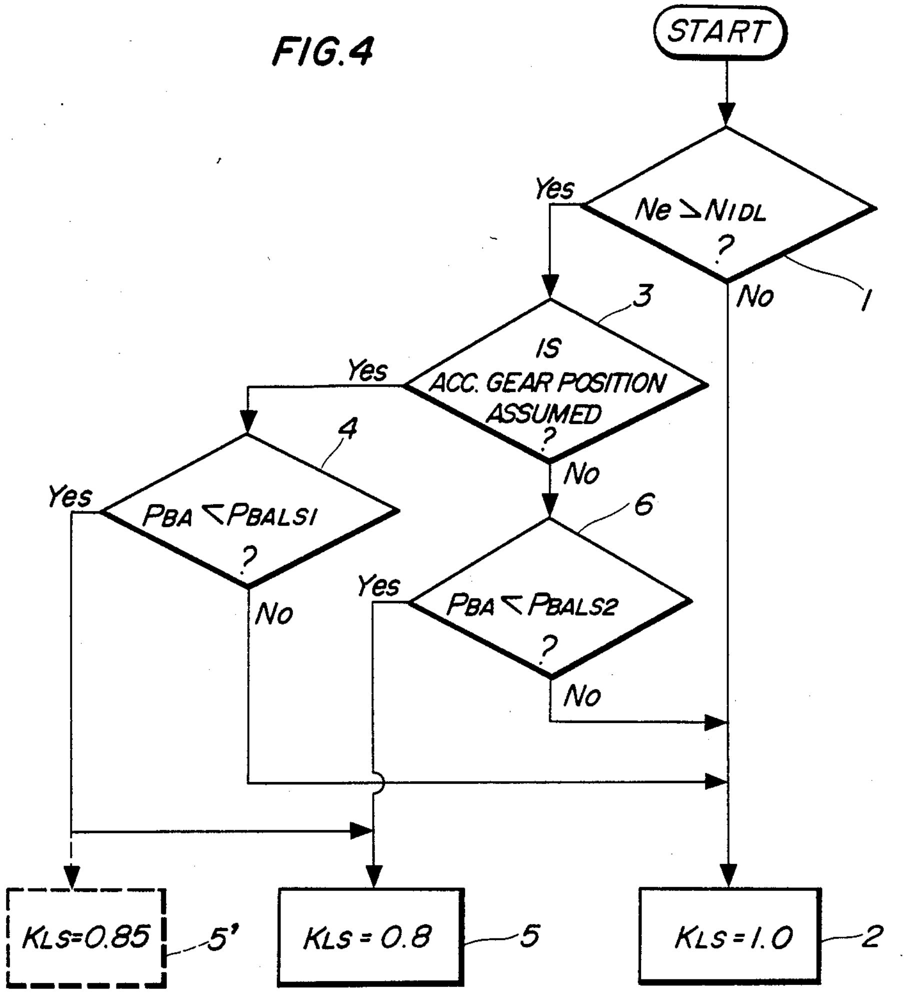
FIG. 4 is a flow chart showing a manner of determining the mixture-leaning regions of the engine and setting the value of a mixture-leaning coefficient KLS, according to the embodiment of FIG. 3.

FIG. 4 is a flow chart of a manner of determining whether or not the engine is operating in a mixture-leaning region and a manner of setting the value of the mixture-leaning coefficient KLS. First, it is determined at the step 1 whether or not the rotational speed Ne of the engine is higher than the predetermined idling rpm NIDL at which the engine is operating with the throttle valve in its idling position. If the answer is no, the value of the mixture-leaning coefficient KLS is set to 1.0 at the step 2. If the answer to the question of the step 1 is affirmative, the program proceeds to the step 3 to determine whether or not the transmission is in an accelerating gear position. If the answer is yes, it is determined at the step 4 whether or not the intake pipe absolute pressure PBA is lower than the first predetermined value PBALS1 (e.g. 250 mmHg). If the answer is yes, the value of the mixture-leaning coefficient KLS is set to the predetermined value XLS (e.g. 0.8), at the step 5. On the other hand, if the answer to the question of the step 4 is negative, the value of the mixture-leaning coefficient KLS is set to 1.0 at the step 2.

Reverting to the step 3, if the answer is negative, the program proceeds to the step 6 where it is determined whether or not the intake pipe absolute pressure PBA is lower than the predetermined value PBALS2 (e.g. 600 mmHg). If the answer is yes, the value of the mixture-leaning coefficient KLS is set to the predetermined value XLS at the step 5, while if the answer is no, the value of the coefficient KLS is set to 1.0 at the step 2.

Although in the foregoing embodiment the mixture-leaning determining value of the engine load parameter is set to a predetermined value depending upon whether the transmission is in an accelerating gear position or in a cruising gear position, the mixture-leaning determining value may alternatively be set to a predetermined value depending upon each of the gear positions (e.g. each of first to fifth speed gear positions) by determining which of the gear positions the transmission gear assumes, in a manner such that the mixture-leaning determining value is set to a smaller predetermined value as the transmission assumes a lower speed gear position. According to this alternative manner, the air-fuel ratio control may be effected in a manner more appropriate to operating conditions of the engine. Further, although in the foregoing embodiment the value of the mixture-leaning coefficient KLS is set to the same predetermined value XLS both when the engine is operating in the mixture-leaning region II and when it is operating in the other mixture-leaning region III, alternatively the value of the coefficient KLS applicable to the mixture-leaning region II in which leaning of the mixture is effected only when the transmission assumes a cruising gear position may be set to a predetermined value smaller than that applicable to the mixture-leaning region III, so as to assure further improved fuel consumption without spoiling the driveability of the engine. For example, as indicated by the dotted lines, if it is determined at the step 4 that the intake pipe absolute pressure PBA is lower than the first predetermined value PBALS1, the program may proceed to the step 5' to set the value of the mixture-leaning coefficient KLS to a value of 0.85 which is larger than 0.8 in the step 5.

Figure 5:
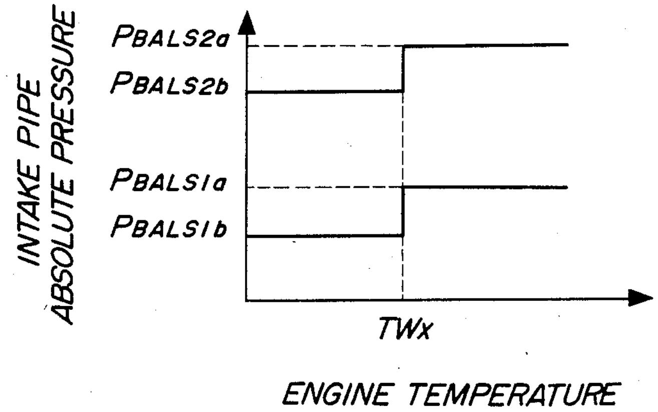
FIG. 5 is a graph showing the relationship between predetermined values PBALS1, PBALS2 of intake pipe absolute pressure PBA as mixture-leaning determining values and the engine coolant temperature.

Further, the mixture-leaning determining value of the engine load parameter may be set to a predetermined value dependent upon the engine temperature in such a manner that when the engine temperature sensed by the engine coolant temperature sensor 10 is lower than a predetermined value, the mixture-leaning determining value of the engine load parameter is set to a smaller value than when the engine temperature is higher than the predetermined value, thus reducing the whole area of the whole mixture-leaning region so as to ensure positive spark ignition of the ignition plugs of the engine which would be impeded by leaning of the mixture effected when the engine is in a cold state. For example, as shown in FIG. 5, when a detected value of engine coolant temperature TW is higher than a predetermined value TWx, the aforementioned predetermined values PBALS1, PBALS2 are set to higher values PBALS1*a*, PBALS2*a*, respectively, while when the temperature TW is lower than the predetermined value TWx, the values PBALS1, PBALS2 are set to lower values PBALS1*b*, PBALS2*b*, respectively.

Moreover, when the engine is operating in a high speed region where the engine rotational speed Ne exceeds a predetermined value NH, for instance 4000 rpm as indicated by the two-dot chain line in FIG. 3, the mixture-leaning determining value of the engine load parameter or the values PBALS1, PBALS2 may be set to smaller predetermined values PBALS1', PBALS2' than when the engine rotational speed is larger than the predetermined value NH, thereby avoiding leaning of the mixture when the engine is accelerating in a high load/high speed region to obtain a required engine output.

What is claimed is:

1. A method for controlling the air-fuel ratio of an air-fuel mixture being supplied to an internal combustion engine for a vehicle equipped with a transmission having a plurality of different speed gear positions, in response to operating conditions of the engine by means of electronic control means, the method comprising the steps of:

(1) detecting the value of a first parameter indicative of loads on said engine;

(2) detecting the value of a second parameter indicative of which of said gear positions said transmission assumes;

(3) preselecting predetermined values of said first parameter which correspond to loads imposed on said engine when said transmission assumes respective ones of said different speed gear positions; and (4) leaning the mixture being supplied to said engine to an air-fuel ratio larger than a stoichiometric mixture ratio when the detected value of said second parameter is indicative of a gear position assumed by said transmission and at the same time the detected value of said first parameter is smaller than the predetermined value thereof which corresponds to said assumed gear position.

2. A method as claimed in claim 1, wherein said step (3) comprises setting said predetermined values of said first parameter to smaller values as they correspond to the lower speed ones of said at least two gear positions of said transmission.

3. A method as claimed in claim 1, wherein said engine has an intake passage and a throttle valve arranged in said intake passage, said first parameter comprising absolute pressure in said intake passage at a location downstream of said throttle valve.

4. A method as claimed in claim 1, wherein said at least two of said gear positions of said transmission include a first gear position assumed when said engine is required to operate in a cruising condition, and a second gear position assumed when said engine is required to operate in an accelerating condition, said step (2) comprising determining whether said transmission assumes said first gear position or said second gear position.

5. A method as claimed in claim 4, including the step of setting a first mixture-leaning region in which said first parameter has a value smaller than a first predetermined value and in which leaning of said mixture is effected irrespective of whether said transmission assumes said first gear position or said second gear position, and a second mixture-leaning region in which said first parameter is larger than said first predetermined value but smaller than a second predetermined value and in which leaning of said mixture is effected only when the detected value of said second parameter is indicative of said first gear position, wherein said mixture is leaned to obtain the same air-fuel ratio between when said engine is operating in said first mixture-leaning region and when said engine is operating in said second mixture-leaning region.

6. A method as claimed in claim 4, including the step of setting a first mixture-leaning region in which said first parameter has a value smaller than a first predetermined value and in which leaning of said mixture is effected irrespective of whether said transmission assumes said first gear position or said second gear position, and a second mixture-leaning region in which said first parameter is larger than said first predetermined value but smaller than a second predetermined value and in which leaning of said mixture is effected only when the detected value of said second parameter is indicative of said first gear position, wherein said mixture is leaned to obtain a larger air-fuel ratio when said engine is operating in said second mixture-leaning region than when said engine is operating in said first mixture-leaning region.

7. A method as claimed in claim 1, including the steps of detecting the value of a third parameter indicative of the temperature of said engine, setting said predetermined value of said first parameter to a first predetermined value when the detected value of said third parameter is higher than a predetermined value, and setting said predetermined value of said first parameter to a second predetermined value which is smaller than said first predetermined value when the detected value of said third parameter is lower than said predetermined value thereof.

8. A method as claimed in claim 1, including the steps of detecting the value of a fourth parameter indicative of the rotational speed of said engine, setting said predetermined value of said first parameter to a first predetermined value when the detected value of said fourth parameter is lower than a predetermined value, and setting said predetermined value of said first parameter to a second predetermined value which is smaller than said first predetermined value when the detected value of said fourth parameter is larger than said predetermined value thereof.

9. A method as claimed in claim 1, wherein said predetermined value of said first parameter is set at different values between when leaning of said mixture is initiated and when the same is terminated.

10. A method as claimed in claim 1, including the step of detecting the rotational speed of said engine, and prohibiting said leaning of the air-fuel mixture when the detecting value of the rotational speed of said engine is smaller than a predetermined value.

* * * * *